United States Patent
Lane

(10) Patent No.: US 9,914,669 B2
(45) Date of Patent: Mar. 13, 2018

(54) SYSTEMS AND METHODS FOR PLASMA-BASED FLUID TREATMENT

(71) Applicant: Atlas Agriculture Systems, Inc., Roslyn, NY (US)

(72) Inventor: Jason Lane, Roslyn, NY (US)

( * ) Notice: Subject to any disclaimer, the term of this patent is extended or adjusted under 35 U.S.C. 154(b) by 0 days.

(21) Appl. No.: 15/396,803

(22) Filed: Jan. 2, 2017

(65) Prior Publication Data

US 2017/0144942 A1    May 25, 2017

Related U.S. Application Data

(63) Continuation of application No. 14/084,097, filed on Nov. 19, 2013, now Pat. No. 9,533,898.

(60) Provisional application No. 61/847,721, filed on Jul. 18, 2013.

(51) Int. Cl.
| | | |
|---|---|---|
| C02F 1/60 | (2006.01) | |
| C05C 11/00 | (2006.01) | |
| C02F 1/68 | (2006.01) | |
| C05B 17/00 | (2006.01) | |
| C05G 3/00 | (2006.01) | |

(52) U.S. Cl.
CPC ............... C05C 11/00 (2013.01); C02F 1/68 (2013.01); C05B 17/00 (2013.01); C05G 3/0064 (2013.01); *C02F 2301/043* (2013.01); *C02F 2301/046* (2013.01)

(58) Field of Classification Search
CPC ....... C05C 11/00; C05G 3/0064; C05B 17/00; C02F 2301/043; C02F 2301/046; C02F 1/60
See application file for complete search history.

(56) References Cited

U.S. PATENT DOCUMENTS

| | | | | |
|---|---|---|---|---|
| 4,141,715 A | * | 2/1979 | Wyse | B01J 19/088 204/179 |
| 6,228,266 B1 | * | 5/2001 | Shim | C02F 1/4608 205/753 |
| 2003/0146310 A1 | * | 8/2003 | Jackson | A62D 3/19 239/690 |
| 2013/0206704 A1 | * | 8/2013 | Hengsperger | B01D 19/0057 210/748.19 |
| 2014/0246364 A1 | * | 9/2014 | Hruska | C01B 13/11 210/143 |
| 2016/0102025 A1 | * | 4/2016 | Nunnally | C05C 5/00 424/616 |

* cited by examiner

*Primary Examiner* — Walter D. Griffin
*Assistant Examiner* — Cameron J Allen
(74) *Attorney, Agent, or Firm* — Capitol Patent & Trademark Law Firm, PLLC

(57) ABSTRACT

The disclosed invention relates to a liquid treatment system comprising a fluid input channel and a plasmatron coupled to the fluid input channel, the plasmatron operative to affix nitrogen to liquid received from the fluid input channel resulting in treated liquid. The system further comprises a liquid chamber connected to the plasmatron for storing treated liquid and a treated fluid output channel connected to the liquid chamber.

7 Claims, 4 Drawing Sheets

SYSTEMS AND METHODS FOR PLASMA-BASED FLUID TREATMENT

CROSS-REFERENCE TO RELATED APPLICATIONS

This application is a continuation of U.S. application Ser. No. 14/084,097, filed Nov. 19, 2013, which claims the benefit of U.S. Provisional Application Ser. No. 61/847,721, filed Jul. 18, 2013, both applications incorporated herein by reference.

FIELD OF THE INVENTION

The present invention relates to water treatment systems and methods, and more particularly, to treatment of water and other liquids or fluids with plasma.

BACKGROUND OF THE INVENTION

Generally, it is know in the prior art to treat water and other liquids or fluids for improved qualities such as for removing waste or undesirable compounds and for introducing beneficial additives for specific applications or uses.

Examples of prior art references include U.S. Pat. No. 7,291,314 for "Activated water apparatus and methods," filed Dec. 20, 2001 by Gorodkin et al., describes an apparatus that subjects water to waves from an RF plasma, which allows continuous production of "activated water" characterized by cluster sizes below about 4 molecules per cluster, water having a pH below 4 or above 10, or water having ORP of less than −350 mV or more than +800 mV. The basic frequency of the plasma is preferably between 0.44 MHz and 40.68 MHz, and the plasma is preferably modulated at a frequency between 10 kHz and 34 kHz. Flow rates typically range from 20 l/hr to about 2000 l/hr. Activated water can be used for many purposes, including antimicrobial cleaning of worktable, floor wall, knife, transport and other surfaces, for example, in meat processing facilities and hospitals.

Additionally, current techniques utilized in the agricultural industry rely on fertilizers and other contaminants to increase the growth rate and yield of crops and other plant life. This use of fertilizers results in a plethora of harmful and toxic chemicals and substances being introduced into the targeted plant life such as ammonium phosphate, urea, potassium chloride, boric acid, and others. Thus there currently exists a need in the art for a safe method of water treatment that enhances the growth potential of plant life while eschewing the use of harmful accelerants such as fertilizers.

SUMMARY OF THE INVENTION

The disclosed invention provides a system for treating liquid, such as water, the system comprising a fluid input channel and a plasmatron coupled to said fluid input channel, said plasmatron operative to affix nitrogen to liquid received from said fluid input channel resulting in treated liquid. The system further comprises a liquid chamber connected to said plasmatron for storing treated liquid and a treated fluid output channel connected to said liquid chamber.

In one embodiment the system may comprise a secondary channel connected between said fluid input channel and said treated fluid output channel, said secondary channel comprising either a recirculation channel, bypass channel, or combination thereof. In alternative embodiments, the system comprises a gas generator. In alternative embodiments, the system comprises a secondary plasmatron connected in series with the first plasmatron.

In one embodiment, the system comprises a plurality of cartridges and a mixing chamber connected to said cartridges and said liquid chamber wherein the mixing chamber is connected to said cartridges and said liquid chamber through a plurality of valves. The cartridges may include at least one of a phosphorous or potassium cartridge, or combination thereof. Finally, the system may include a high voltage power supply and a computer/display.

The disclosed invention additionally describes a method for generating treated liquid the method comprising received a liquid input, creating a plasma field, passing said liquid input through said plasma field, affixing nitrogen to said liquid input as a result of passing said liquid input through said plasma field resulting in a treated liquid, and producing a treated liquid output.

In one embodiment, the method further comprises passing a portion of said treated liquid output through a plasma field. Alternatively, the method may comprise combining a portion of said liquid input with said treated liquid output without passing said portion through said plasma field.

In one embodiment, producing a treated liquid output comprises storing said treated liquid output in a liquid chamber, wherein the method is operative to transfer said treated liquid output from said liquid chamber to a mixing chamber. In one embodiment, the method combines said treated liquid output with phosphorous in said mixing chamber. In one embodiment, the method combines said treated liquid output with potassium in said mixing chamber.

The figures are illustrative examples of the present invention and are not intended to limit the invention thereto.

DETAILED DESCRIPTION

In the following description of the embodiments of the disclosure, reference is made to the accompanying drawings that form a part hereof, and in which is shown by way of illustration exemplary embodiments in which the invention may be practiced. It is to be understood that other embodiments may be utilized and structural changes may be made without departing from the scope of the disclosed invention.

The present invention provides fluid treatment systems and methods, and an apparatus for providing activated water or other liquids or fluids by treating a fluid flow with plasma and/or plasma waves to improve the fluid properties, in particular for improving water properties for agricultural applications. The present invention systems, methods, and apparatus embodiments, when applied to water, provide activated or plasma-treated water and other liquids or fluids for agricultural applications for improved plant germination, growth and yield for reduced or eliminated need for pesticides and/or fertilizers.

Notably, in all cases herein, the present invention description is applied to fluids and to fluid flows; in one embodiment, water is the fluid treated by plasma and/or plasma waves for changing it to have improved properties. However, the present invention is directed to water, and to other liquids, and to fluids.

Figure 1:
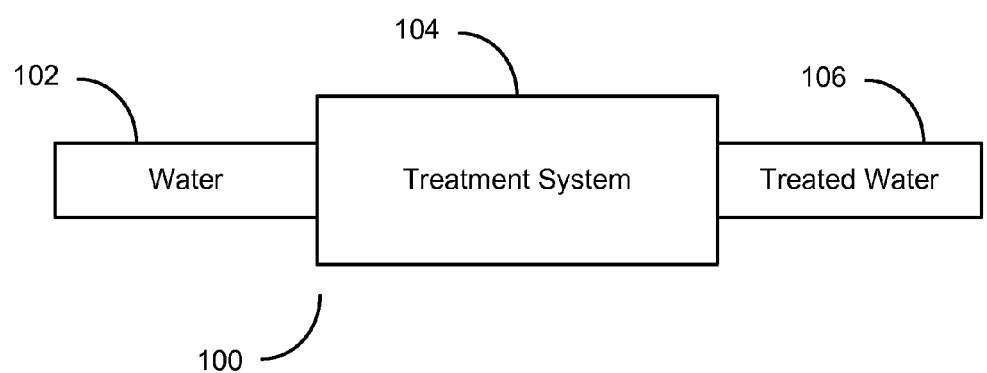
FIG. 1 illustrates a block diagram of a liquid treatment system according to one embodiment.

FIG. 1 illustrates a water treatment system according to one embodiment of the disclosure. As illustrated in FIG. 1 a system 100 comprises treatment system 104 receives a liquid input, such as water via an input channel 102, and produces treated liquid, such as treated water via an outlet channel 106.

The system 100 provides a treatment system 104 that is connectable to a water system (not pictured) that includes an input channel 102 containing a water flow. In one embodiment input channel 102 may be connected to a spigot, hose, or other transport mechanism capable of transporting liquid. In an alternative embodiment, the treatment system 104 may release the treated water to a reservoir and/or for immediate application, preferably for agricultural applications.

Water or other liquid or fluid flow rates may have significant ranges for effective treatment by the treatment system 104. The techniques performed by treatment system 104 and discussed in detail herein are infinitely scalable for accommodating various water flow rates. By way of example and not limitation, water or other liquid or fluid flow is between about 1 gallon per minute (gpm) and about 6 gpm where the water source is a residential water line; wafer flow is between about 1 gpm and about 100 gpm where the water or other liquid or fluid source is a commercial water line. In embodiments disclosed herein, a water, or other liquid or fluid, treatment system 104 may be connected to each of a multiplicity of water flow lines. In another alternative embodiment, a treatment system 104 is connectable to a single water flow line that is later extended into a multiplicity of outlets for agricultural irrigation applications.

For agricultural applications of the treated water or other liquid or fluid produced by the treatment system 104, a yield enhancement is provided without the addition of fertilizers, pesticides, or other chemicals to stimulate growth and protection of the subject plants. The activated or treated water reduces or eliminates the need for these additives, and still provides up to 1,000% better plant growth and/or yield compared with a control, untreated subject plant of the same variety. Yield and/or growth enhancement for agricultural applications are between about 20% and about 1,000% increase, depending upon the type of plant. Also, the concentration of nitrogen in the activated or treated water may affect the yield and/or growth enhancement. In some instances, there may be no growth or yield enhancement from the treated water or other liquid or fluid, but the subject plants may be grown with reduced fertilizers or pesticides, or without fertilizers or pesticides.

Figure 2:
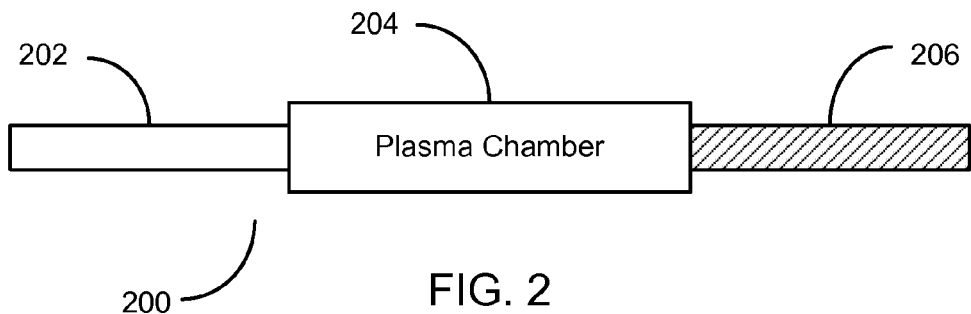
FIGS. 2-6 illustrate block diagrams of plasma-based treatment systems according to multiple embodiments.

FIGS. 2 through 6 illustrate various configurations of the treatment system described previously. FIG. 2 illustrates a configuration of a water treatment system 200 containing an input channel 202, a plasma chamber 204, and an output channel 206. As illustrated in FIG. 2, plasma chamber 204 may comprise any plasma source and/or configuration that produces a plasma field and corresponding waves for treating the fluid flow directly is operable with the present invention, provided the plasma contacts air in the presence of the fluid flow and produces nitrogen that attaches to the fluid molecule(s); in the case of water, nitrogen attaches to the water molecules. Specifically, the plasma chamber produces "free nitrogen" as distinct from naturally occurring or artificially induced $N_2$. As understood in the art, $N_2$ has an ionization potential of over 13 eV and thus cannot be used directly in treating liquid such as water. Thus, the plasma chamber "unbinds" the $N_2$ to create nitrate that may be dissolved within a liquid such as water. As illustrated, the treatment system 200 provides a plasma source and passes a fluid flow through the plasma and/or plasma waves (or plasma field) produced thereby.

Figure 3:
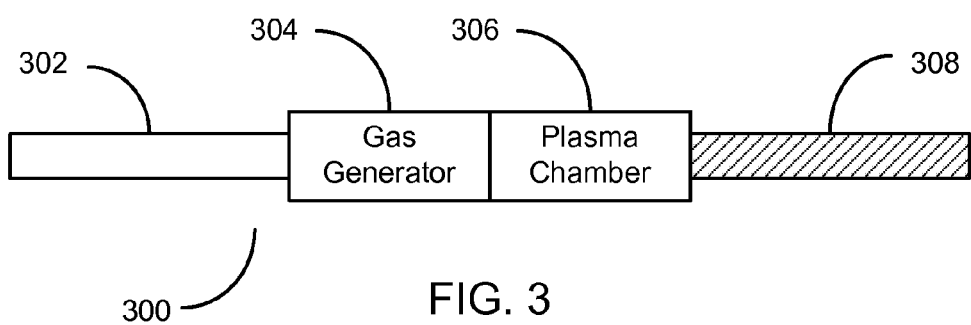

FIG. 3 illustrates an alternative configuration of a treatment system similar to FIG. 2 but containing a gas generator 304. In the illustrated embodiment, the treatment system 300 includes a chamber within the gas generator 304 that is filled with a gas, such as nitrogen. Using this gas generator 304, the system 300 is operative to introduce or cause atmospheric nitrogen to attach, affix, fix, or bond to the molecules in the fluid flow received from input channel 302. Thus, the fluid exiting from the output channel 308 includes nitrogen affixed or attached to water molecules in the water flow is produced and exits the outlet.

Figure 4:
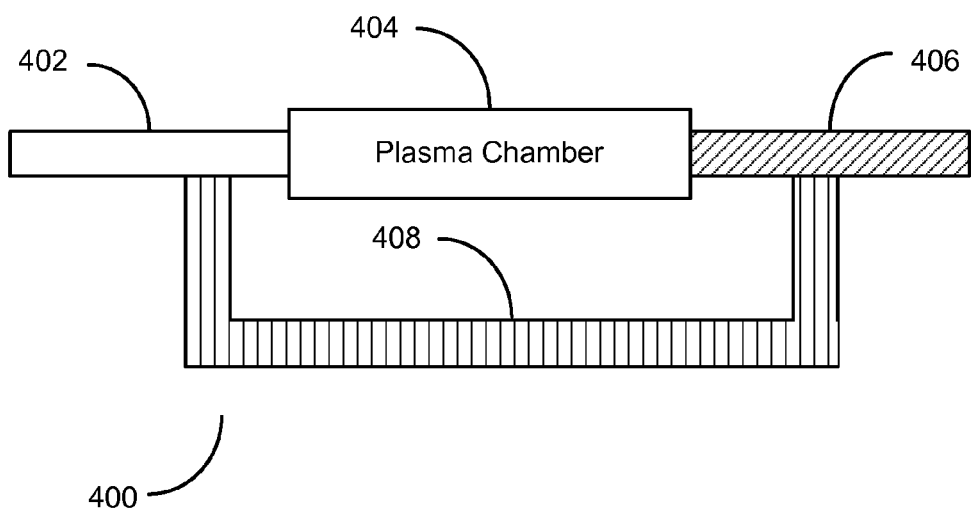

FIG. 4 illustrates an alternative configuration of a treatment system similar to FIG. 2 but containing a secondary channel 408 allowing for an alternative fluid flow. In some embodiments, the secondary channel 408 acts as a recirculator channel. That is, fluid may pass through the plasma chamber 404 and a portion of the output fluid may be recirculated back to the input channel 402. In alternative embodiments, the secondary channel 408 may act as a bypass channel wherein a portion of the input fluid from input channel 402 bypasses the plasma chamber 404 and is passed, unchanged, to the output channel 406.

In the illustrated embodiment, the secondary channel 408 may comprise a variable flow channel wherein the amount of liquid passing through said secondary channel 408 may be controlled externally. When secondary channel 408 is configured as a recirculator, a portion of the treated liquid is treated more than once, thus allowing for greater treatment. In contrast, when the secondary channel 408 is configured as a bypass, untreated liquid is combined with treated liquid, effectively diluting the treated liquid. Thus, when configured as a bypass or recirculator the treatment system 400 can be utilized to dilute or strengthen the treated liquid. In alternative embodiments the secondary channel 408 can simultaneously act as both a recirculator or as a bypass. For example, a user of the treatment system 400 may be able to control the mode of operation of the secondary channel 408 to either dilute or strengthen the treated liquid as discussed previously.

Figure 5:
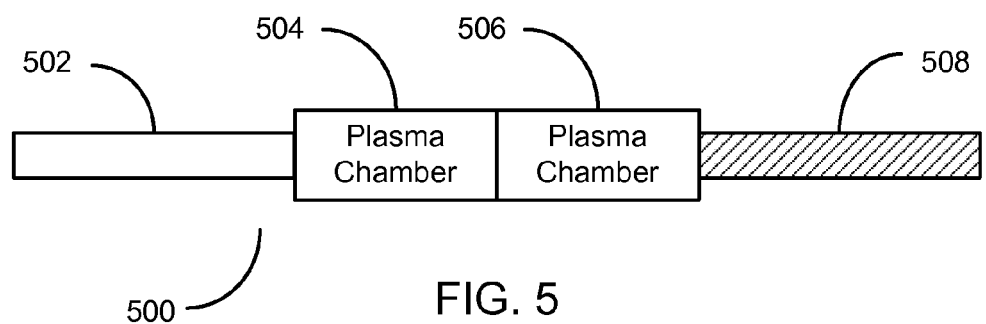

FIG. 5 illustrates an alternative configuration of a treatment system similar to FIG. 2 but containing two plasma chambers 504, 506. Although illustrated in series, plasma chambers 504, 506 may alternatively be connected in parallel. Additionally, alternative combinations may exist wherein additional plasma chambers are added in addition to plasma chambers 504, 506, either in parallel or in series. In the illustrated embodiment, the use of two plasma chambers 504, 506 allows for treatment of liquid twice thus increasing the strength of the treated liquid. That is, for example, the treatment of liquid using two plasma chambers increases the concentration of nitrogen affixed to the input liquid.

Figure 6:
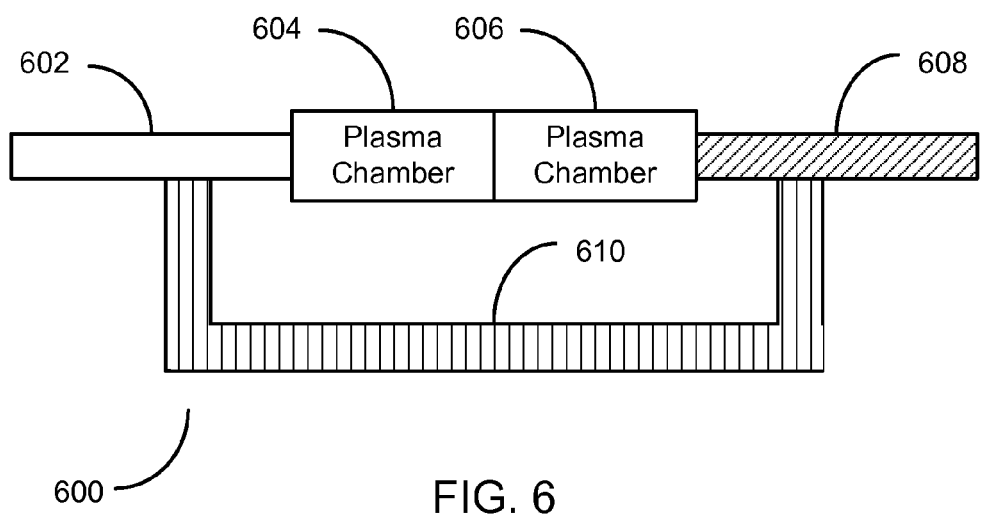

FIG. 6 illustrates an alternative configuration of a treatment system similar to FIG. 5 but containing a secondary channel 610. As discussed previously, secondary channel 610 may act as a recirculator or, alternative or in conjunction with, as a bypass channel. As discussed previously, the use of a recirculator or bypass may allow for the increasing or decreasing of treatment concentration.

Figure 7:
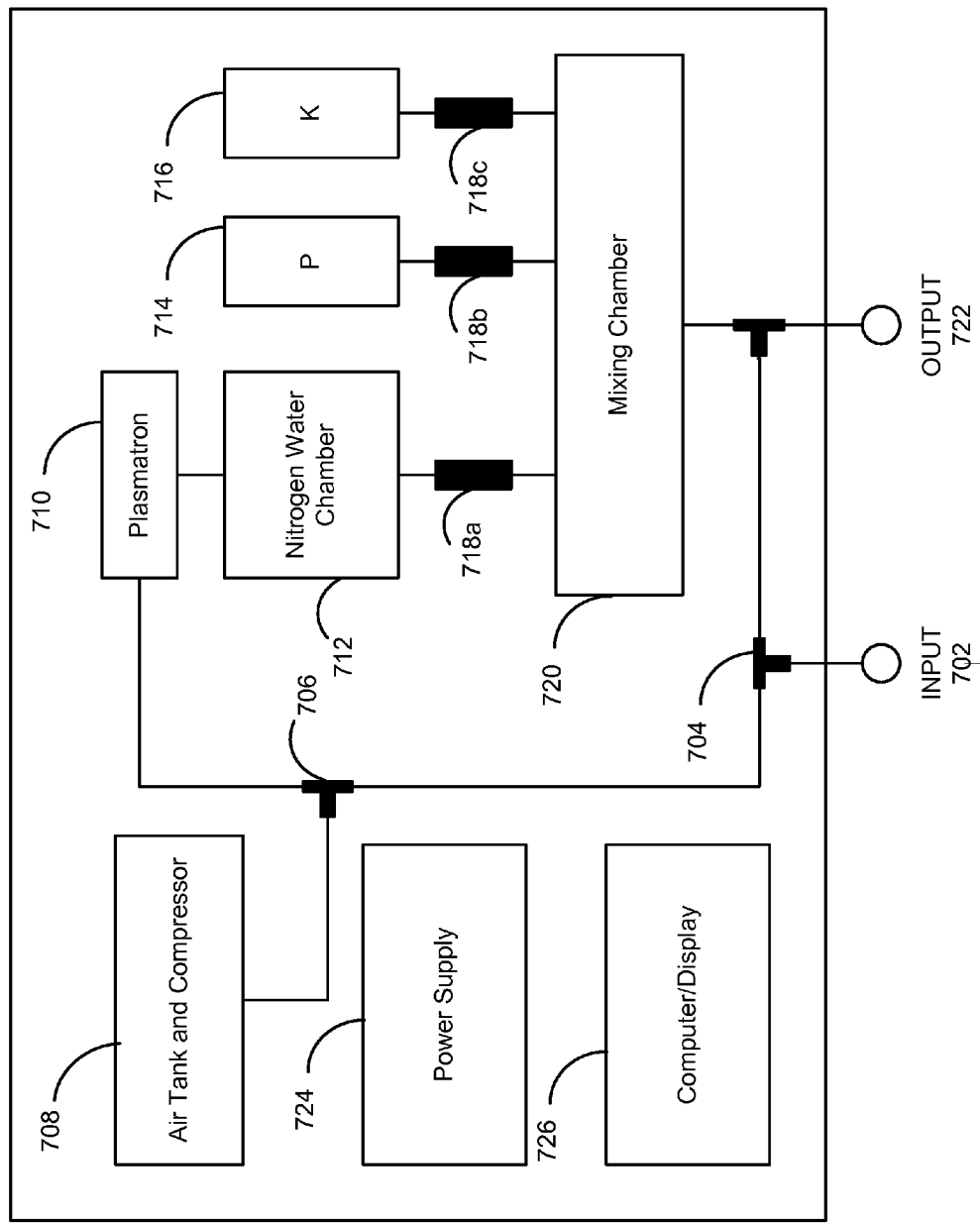
FIG. 7 illustrates a block diagram of a plasma-based treatment system according to one embodiment.

FIG. 7 illustrates a block diagram of a plasma-based treatment system 700 according to one embodiment. In one embodiment, the components of the treatment system 700 may reside in a single device or enclosure. In such an embodiment, the typical dimensions are approximately 30 inches in height, approximately 20 inches in depth or width, and approximately 36 inches in length. The apparatus may be scaled larger for accommodating greater water or other liquid or fluid flow systems, and/or may be scaled smaller for accommodating residential water or other liquid or fluid flow systems. In alternative embodiments, the treatment system 700 may comprise a modular system comprising individual components that may be configured as needed.

As the embodiment of FIG. 7 illustrates, a treatment system 700 contains an input channel 702. Input channel 702 is connected to an input tee 704. Input tee 704 is connected to tee 706 and to plasmatron 710 via tee 706. As illustrated in FIG. 7, liquid input to the treatment system 700 flow through tee 704 until reaching tee 706. At tee 706 the liquid is infused with air from air tank and compressor 708. Thus, as illustrated in coming liquid is infused with nitrogen and other elements from the air compressor 708 prior to entering the plasmatron 710.

Plasmatron 710, and other components, are powered using high voltage power supply 724. In one embodiment of the present invention, input voltage to the treatment system 700 is about 100 volt alternating current at 60 hertz. However, so long as a plasma spark is ignited and provided with interaction with the fluid flow, it creates the nitrogen fixation to the water or other liquid for fluid molecules with a standard voltage, low amperage, variable pulses, and variable frequency. As discussed previously, the treatment system 700 may additionally contain a gas generator (not pictured) which provides gas, such as nitrogen, to plasmatron 710.

After fluid is passed through the plasmatron and nitrogen is attached to the incoming fluid, the nitrogen fixated liquid is stored within a chamber 712. The use of a liquid chamber 712 allows for control of the flow of treated liquid to the subsequent output as will be discussed. The treatment system 700 may optionally contain a phosphorous cartridge 714 and a potassium cartridge 716. Notably, however, such cartridges are not required for the treatment of water but rather provide additional treatment as will be discussed below.

Chamber 712 and cartridges 714 and 716 may be connected to a mixing chamber 720 via computer-controlled valves 718*a-c*. In the illustrated embodiment, these valves control the flow of materials from the chamber 712 and cartridges 714, 176 and thus may allow for differing concentrations of each into the mixing chamber 720. In alternative embodiments, the treatment system may not contain cartridges 714, 716. In such an embodiment, the treatment system 700 may further eschew the use of a mixing chamber 720 and may pass treated water directly to the output tee 722.

As illustrated in FIG. 7, treated liquid is passed to output tee 722. The use of an output tee 722 allows for liquid to be conditionally directed towards output channel 722 or diverted back into input tee 704. As discussed previously, the use of tees 704 and 722 allow for the use of a recirculator or bypass channel to increase or decrease the concentration of the treated liquid, respectively. The treatment system 700 further comprises a computer and integrated display 726. The computer and display 726 allows for the control of the treatment system 700. For example, the computer may be utilized to control the flow of material through valves 718*a-c*, as discussed previously.

Although not illustrated, the treatment system 700 may have devices, such as dials or switches to adjust the pH of the outflow water or other liquid; it may also have devices such as dials or switches or other controls to adjust the amount of nitrates, nitrites, or other forms of nitrogen. The treatment system 700 it may also have wireless, WiFi, GPS, and/or other capabilities. The treatment system 700 may have other power sources, such as polar power, hydroelectric energy, or alternative energy source; a nitrogen generator or other gas generator may be provided with the present invention as well.

Certain modifications and improvements will occur to those skilled in the art upon a reading of the foregoing description. By way of example, while the foregoing specification emphasizes water or other liquid or fluid flow treatment for application to plants, seeds, or other agricultural applications without storing the treated or activated water, it is possible to store the treated water or other liquid or fluid at least temporarily before agricultural application. Also, while plasma and/or plasma waves are considered for treating the fluid effectively, static electricity or other electricity supply sufficient to bond nitrogen to water or other liquid or fluid molecules for creating treated water or other liquid or fluid may be used.

Additionally or alternatively, the treated water is preferably applied directly to plants and/or seeds in agricultural applications, however, the treated water or other liquid or fluid may be mixed with untreated water or other liquid or fluid, i.e., diluted, before application. Also, the amount of treated water or other liquid or fluid will vary by plant type.

FIGS. 1-7 are conceptual illustrations allowing for an explanation of the disclosed invention. Notably, the figures and examples above are not meant to limit the scope of the disclosed invention to a single embodiment, as other embodiments are possible by way of interchange of some or all of the described or illustrated elements. Moreover, where certain elements of the disclosed invention can be partially or fully implemented using known components, only those portions of such known components that are necessary for an understanding of the disclosed invention are described, and detailed descriptions of other portions of such known components are omitted so as not to obscure the invention. In the present specification, an embodiment showing a singular component should not necessarily be limited to other embodiments including a plurality of the same component, and vice-verse, unless explicitly stated otherwise herein. Moreover, applicant does not intend for any term in the specification or claims to be ascribed an uncommon of special meaning unless explicitly set forth as such. Further, the disclosed invention encompasses present and future known equivalents to the known components referred to herein by way of illustration.

The foregoing description of the specific embodiments so fully reveal the general nature of the invention that others can, by applying knowledge within the skill of the relevant art(s) (including the contents of the documents cited and incorporated by reference herein), readily modify and/or adapt for various applications such specific embodiments, without under experimentation, without departing from the general concept of the disclosed invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation such that the terminology or phraseology of the present specification is to be interpreted by the skilled artisan in light of the teachings and guidance presented herein, in combination with the knowledge of one skilled in the relevant art(s).

While various embodiments of the disclosed herein have been described above, it should be understood that they have been presented by way of example, and not limitation. It would be apparent to one skilled in the relevant art(s) that various changes in form and detail could be made therein without departing from the spirit and scope of the invention. Thus, the disclosed invention should not be limited by any of the above-described exemplary embodiments but should be defined only in accordance with the following claims and their equivalents.

I claim:

1. A system comprising:
   a fluid input channel for providing a flow of a selected liquid;
   a plasma chamber coupled to said fluid input channel, said plasma chamber configured to contact air in the presence of the flow of the selected liquid and produce nitrogen that attaches to the liquid molecule to create a treated liquid;
   a liquid chamber connected to the plasma chamber for storing the treated liquid;
   a plurality of cartridges, wherein at least one of the plurality of cartridges comprises a phosphorous cartridge or a potassium cartridge;
   a mixing chamber connected to said plurality of cartridges and said liquid chamber; and
   a fluid output channel connected to said liquid chamber for providing the treated liquid as the system output.

2. The system of claim 1 further comprising a secondary channel connected between said fluid input channel and said fluid output channel.

3. The system of claim 2 wherein said secondary channel is a recirculation channel for re-introducing at a least a portion of the treated liquid to the plasma chamber.

4. The system of claim 2 wherein said secondary channel is a bypass channel for delivering at least a portion of the selected liquid directly to the fluid output channel without passing through the plasma chamber.

5. The system of claim 1 further comprising a gas generator for providing nitrogen to the plasma chamber.

6. The system of claim 1 wherein said mixing chamber is connected to said plurality of cartridges and said liquid chamber through a plurality of valves.

7. A method for generating treated liquid, the method comprising receiving a liquid input;
   creating a plasma field within a chamber;
   passing said liquid input through said plasma field so as to allow nitrogen present in the chamber to attach to the liquid molecule to create a treated liquid;
   mixing the liquid that passes through the plasma field in a mixing chamber with phosphorus or potassium supplied from a phosphorous cartridge or a potassium cartridge, respectively; and
   producing a treated liquid output.

* * * * *